US00RE42971E

(19) United States
(12) Reissued Patent
Chamoun

(10) Patent Number: US RE42,971 E
(45) Date of Reissued Patent: Nov. 29, 2011

(54) MOTORCYCLE LIFT

(75) Inventor: Teffy R. Chamoun, Sycamore, IL (US)

(73) Assignee: TC Development & Design, Inc., Cortland, IL (US)

(21) Appl. No.: 12/405,829

(22) Filed: Mar. 17, 2009

Related U.S. Patent Documents

Reissue of:
(64) Patent No.: 6,935,619
Issued: Aug. 30, 2005
Appl. No.: 10/658,704
Filed: Sep. 9, 2003

U.S. Applications:
(60) Continuation of application No. 10/337,165, filed on Jan. 6, 2003, now Pat. No. 6,648,300, which is a division of application No. 09/780,553, filed on Feb. 9, 2001, now Pat. No. 6,575,310.

(51) Int. Cl.
*B66F 3/00* (2006.01)

(52) U.S. Cl. ..... 254/10 B; 254/88; 254/7 B

(58) Field of Classification Search ..... 254/10 B, 254/88, 10 C, 8 R, 8 B, 7 B; 211/20, 22; 280/292, 494
See application file for complete search history.

(56) References Cited

U.S. PATENT DOCUMENTS

| | | | | |
|---|---|---|---|---|
| 1,915,024 | A | 6/1933 | Logette et al. | |
| 2,237,620 | A | 4/1941 | Doughty et al. | |
| 2,471,756 | A | 5/1949 | Larson | |
| 2,573,728 | A | 11/1951 | Pugh, Sr. | |
| 3,430,983 | A * | 3/1969 | Jones | 280/402 |
| 3,542,157 | A | 11/1970 | Noah | |
| 3,785,517 | A * | 1/1974 | Brajkovich | 414/462 |
| 3,861,533 | A | 1/1975 | Radek | |
| 3,997,143 | A | 12/1976 | Rose | |
| 4,015,718 | A * | 4/1977 | Bernard | 211/5 |
| 4,077,607 | A | 3/1978 | Lovelady | |
| 4,324,384 | A | 4/1982 | Elser | |
| 4,420,164 | A | 12/1983 | Mitchell | |
| 4,773,665 | A | 9/1988 | Hindle | |
| 5,211,376 | A | 5/1993 | Anderson | |
| 5,301,817 | A | 4/1994 | Merritt | |
| 5,462,398 | A | 10/1995 | Hymer | |
| 5,464,076 | A | 11/1995 | Benedetto, Jr. | |
| D378,155 | S | 2/1997 | Bartow et al. | |
| 5,609,461 | A | 3/1997 | Lichtenberg | |
| 5,639,067 | A | 6/1997 | Johnson | |
| 5,735,410 | A | 4/1998 | Kallstrom | |
| 5,944,198 | A | 8/1999 | Ihalainen | |

(Continued)

*Primary Examiner* — Lee D Wilson
(74) *Attorney, Agent, or Firm* — Husch Blackwell LLP

(57) ABSTRACT

A lift for raising a motorcycle positioned on a surface of the lift includes a frame defining a wheel-way and a surface along a longitudinal path on the lift. A front end lift assembly includes a drive and is mounted to the frame for living the front portion of the motorcycle from the surface. A rear end lift assembly is mounted to the frame and includes a drive, independent of the front end drive, for lifting the rear portion of the motorcycle from the surface. The front and rear end lift assemblies are operable independently of one another so that the front portion of the motorcycle can be raised from the surface while the rear portion is on the surface, the rear portion of the motorcycle can be raised from the surface while the front portion is on the surface, and either the front or rear portion can be raised from the surface, independently of the other, and when the other portion of the motorcycle is raised from the surface.

10 Claims, 7 Drawing Sheets

U.S. PATENT DOCUMENTS

| | | | | | |
|---|---|---|---|---|---|
| 5,984,339 | A | | 11/1999 | Guild | |
| 5,988,402 | A | * | 11/1999 | Mayfield | 211/20 |
| 6,070,699 | A | | 6/2000 | Bleeker | |
| 6,092,787 | A | | 7/2000 | Nayman | |
| 6,095,746 | A | | 8/2000 | Bergin | |
| 6,575,310 | B2 | * | 6/2003 | Chamoun | 211/22 |
| 6,648,300 | B2 | * | 11/2003 | Chamoun | 254/10 B |
| 6,935,619 | B2 | * | 8/2005 | Chamoun | 254/10 B |
| 2002/0109130 | A1 | * | 8/2002 | Chamoun | 254/10 B |
| 2004/0046160 | A1 | * | 3/2004 | Chamoun | 254/88 |

* cited by examiner

MOTORCYCLE LIFT

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation of U.S. patent application Ser. No. 10/337,165, filed Jan. 6, 2003, now U.S Pat. No. 6,648,300 which is a divisional application of U.S. patent application Ser. No. 09/780,553, filed Feb. 9, 2001, now U.S. Pat. No. 6,575,310.

BACKGROUND OF THE INVENTION

The present invention pertains to a portable motorcycle lift. More particularly, the present invention pertains to a portable motorcycle lift that permits securely lifting the front and rear ends of the motorcycle independently of one another, and further permits stabilized securing of the of the motorcycle in an upright position.

Motorcycle jacks or lifts are known in the art. These devices are used to elevate a motorcycle in order to, for example, perform maintenance on the motorcycle, such as, engine repair, tire changing and the like.

Typically, it is desired to lift the motorcycle to an elevation at which it is comfortable for an individual to carry out such maintenance. This elevation can be from just a few inches off of the ground to a few feet off of the ground.

A wide variety of lifting devices are known in the art. Many such lifting devices use the motorcycle kickstand or rest to support the motorcycle during lifting and maintenance. This may not be desirable in that maintenance may be required to the stand, or the stand may not provide sufficient stability for carrying out the required maintenance. For example, if it is necessary to remove major components on the motorcycle, such as parts of the engine, stability over and above that provided by the stand is desirable, if not required. Additionally, these lifts do not permit positioning the motorcycle fully upright to, for example, drain all of the motor oil from the engine.

Other motorcycle lifts are known that simply elevate the entirety of the motorcycle from the wheels. While this may provide the desired elevation of the motorcycle, it may not provide the necessary stability vis-à-vis preventing the motorcycle from rolling. As such, these lifts can provide a hazard in that the elevated motorcycle can roll from the lift. In addition, such lifts do not provide the required access to the wheels to, for example, remove a wheel.

Still other lifts are known that use straps or the like to hold the motorcycle onto the lift. Again, these lifts suffer from the same stability drawbacks as those that utilize the motorcycle stands. Moreover, using tie-down straps generally requires that one or both the front and rear of the motorcycle is held to the ground or to the lift. Thus, these strap can preclude lifting either or both the front and rear of the motorcycle.

Still other lifts are known that provide the ability to lift either the front wheel or the rear wheel of the motorcycle; however, these lifts do not provide the ability to lift either or both the front and rear wheels, independently of one another, while the other wheel is either on the lift surface, or elevated from the surface.

Accordingly, there exists a need for a motorcycle lift that permits lifting either or both the front and rear wheels of a motorcycle, and further provides the ability to lift these wheels independently of one another. Desirably, such a motorcycle lift includes an arrangement by which the front wheel of the motorcycle is secured from rolling while the front wheel is lifted. Most desirably, such a motorcycle lift is portable and can be mounted for raising the entirety of the lift to elevate the lift with the motorcycle thereon to a desired height.

BRIEF SUMMARY OF THE INVENTION

A motorcycle lift raises an associated motorcycle positioned on the lift from a surface of the lift. The lift includes front and rear end lift assemblies that are operable independently of one another so that the front portion of the motorcycle can be raised from the surface while the rear portion is on the surface and so that the rear portion of the motorcycle can be raised from the surface while the front portion is on the surface.

Advantageously, either the front or rear portions of the motorcycle can be raised from the surface independently of the other and can be raised when the other portion of the motorcycle is also raised from the surface.

The lift includes a frame that defines a wheel-way along a generally longitudinal path on the lift. The wheel-way defines a surface for receiving the motorcycle.

A front end lift assembly is mounted to a front end of the frame. The front end lift assembly is operably connected to the motorcycle at a front end structural member (e.g., the lower triple clamp) and is configured for lifting the front portion of the motorcycle from the surface. The front end lift assembly is disposed at about a front end of the wheel-way and includes a front end lift drive. Preferably, the drive is an electric motor.

In a current embodiment, the front end lift assembly includes a front end drive bar that is operably connected to the frame. The frame provides a track and bearing surface for the drive bar.

In the current embodiment, the front end lift assembly includes a support carriage having symmetrical legs defining free ends and a transverse portion between the legs. The legs are pivotally connected to the drive bar.

A lift arm is mounted to the support carriage for connecting to the motorcycle. Preferably, the lift arm includes a pin for inserting into a lower triple clamp of the motorcycle front end. For stability and for maintaining the carriage upright, first and second opposed pivot arms each extend from the frame to one of the support carriage legs. The pivot arms provide a linkage between the support carriage and the frame.

The rear end lift assembly is mounted to the frame and is operably connected to the motorcycle at rear end structure members (e.g., at the motorcycle swing arms) for lifting the rear portion of the motorcycle from the surface. The rear end lift assembly is disposed at about a rear end of the wheel-way and includes a rear end lift drive.

In a current embodiment, the rear end lift assembly includes a rear end drive bar operably connected to the frame. The frame provides a track and bearing surface for the drive bar.

Support links are pivotally connected to the rear end drive bar. The support links are configured for connecting to the motorcycle rear end structural members for lifting the rear portion of the motorcycle from the surface. Preferably, mounting clips are mounted to the support links. The mounting clips can be V- or U-shaped member or clamp members for engaging the rear end structural member.

In a preferred embodiment, the lift includes a front wheel locking assembly. The locking assembly includes a pivoting saddle mounted to the frame along the wheel-way. The saddle has a concave shape and includes an entrance portion along the wheel-way. The entrance portion lies along the wheel-way for receiving the front wheel of the motorcycle. The saddle pivots between an entry position wherein the entrance portion lies on the surface and a locking position wherein the entrance portion is raised from the surface when the front wheel passes over and beyond the pivot.

The saddle can include a pair of angled arms extending outwardly from a top portion thereof. The arms center the front wheel and prevent the wheel (i.e., handle bars and steering mechanism) from pivoting out of a straight orientation. The front wheel locking assembly can include a wheel stop for engaging the front wheel when the motorcycle is moved onto the lift. The wheel stop can be configured as an upwardly extending, bent channel-shaped member for engaging the front wheel. An angled V-flange can be mounted to an upper end of the wheel stop, for capturing the wheel as it is moved into the stop.

In a current embodiment, the front and rear end lift drives are electric motors. The drives are independently operable and are operably connected to their respective drive bars by screw drives.

In a preferred lift, the front and rear end lift assemblies are pivotally connected to the frame and are pivotal downwardly onto the frame to fold flat. In this manner, the lift is readily prepared for storage and/or transport. The lift can be mounted to a scissor lift to raise the entirety of the lift upward from the ground. For local transport, casters can be mounted to the frame.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
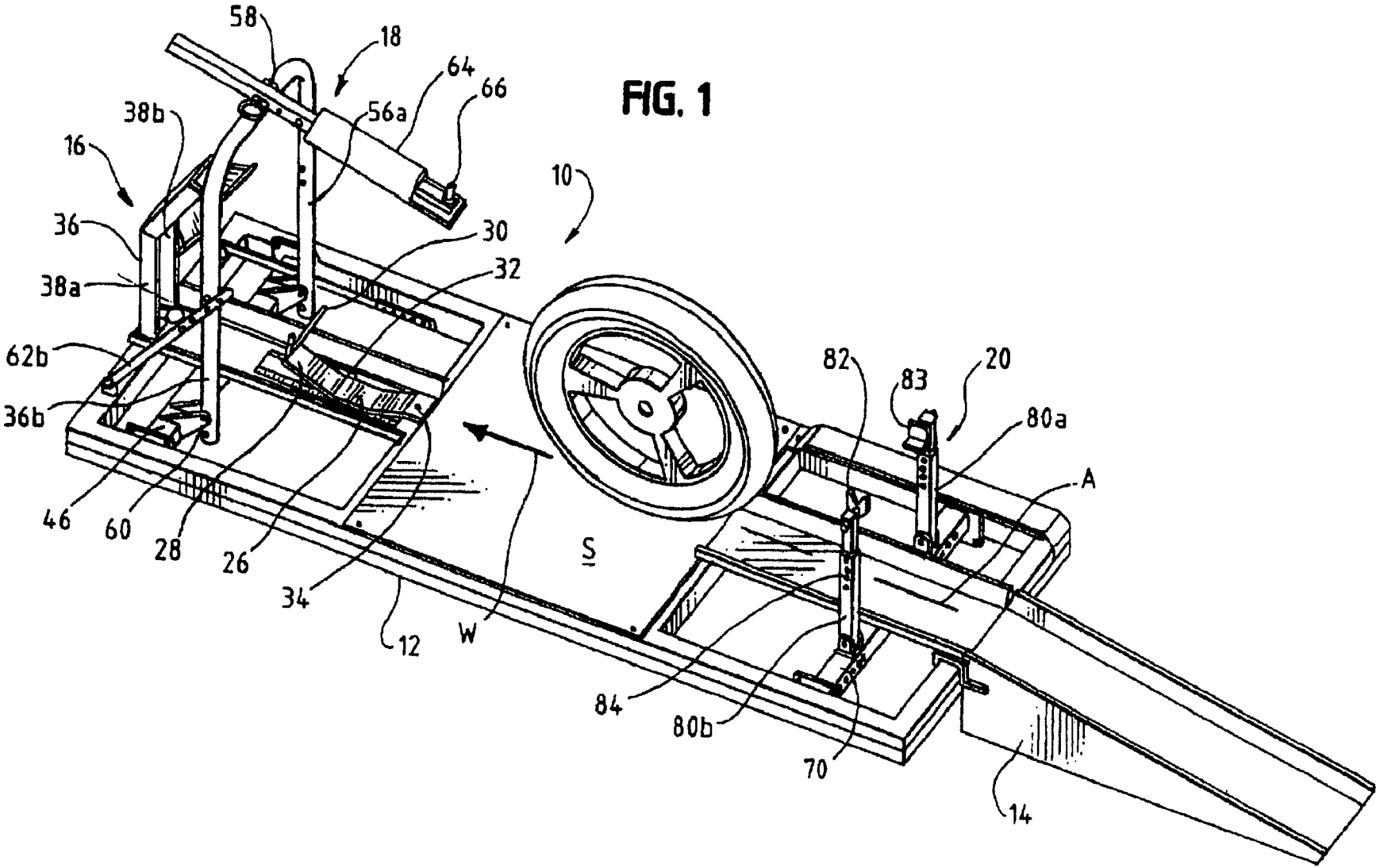
FIG. 1 is a top perspective view of a motorcycle lift embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular to FIG. 1 there is shown generally a motorcycle lift 10 embodying the principles of the present invention. The motorcycle lift 10 includes, generally, a frame 12 and an entrance ramp 14. Mounted to the frame 12, the lift 10 includes a front wheel locking assembly 16, a front end lift assembly 18, and a rear end lock and lift assembly 20. The frame 12 defines a wheel-way W onto which the motorcycle is wheeled onto the lift 10 and along which the motorcycle is secured to the lift 10 when in use. The wheel-way defines a longitudinal path or axis A of the lift 10.

Figure 2:
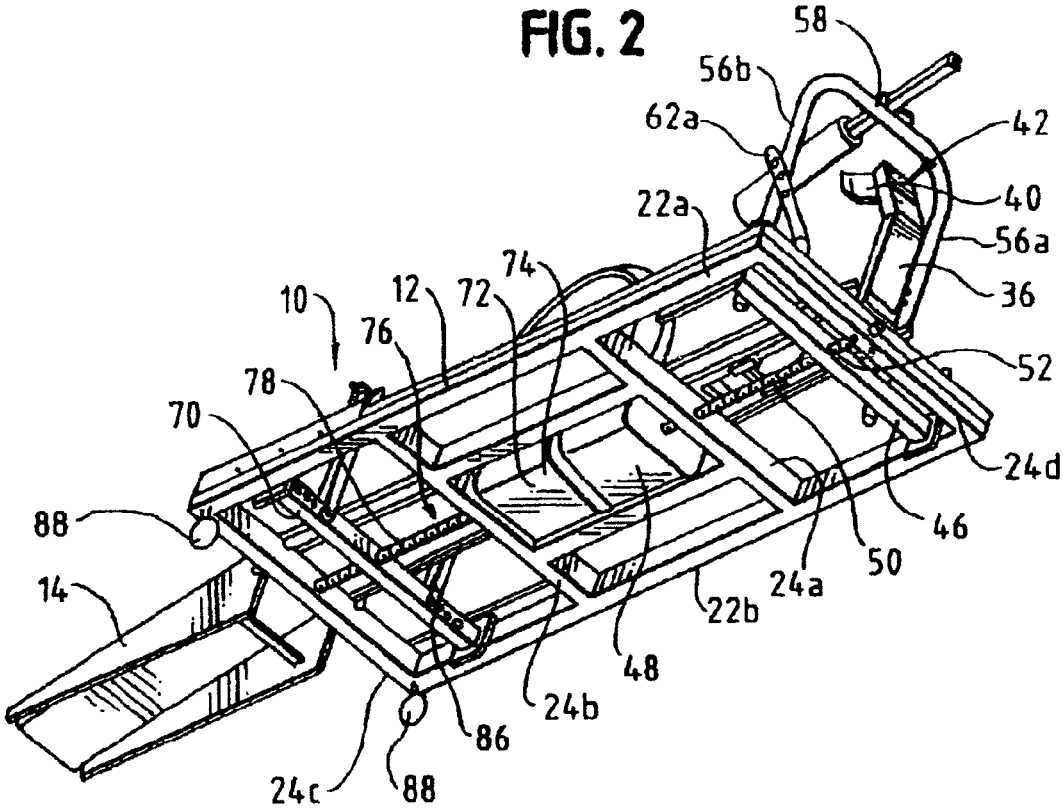
FIG. 2 is a bottom perspective view of the motorcycle lift of FIG. 1 as shown from the front of lift.
Figure 3:
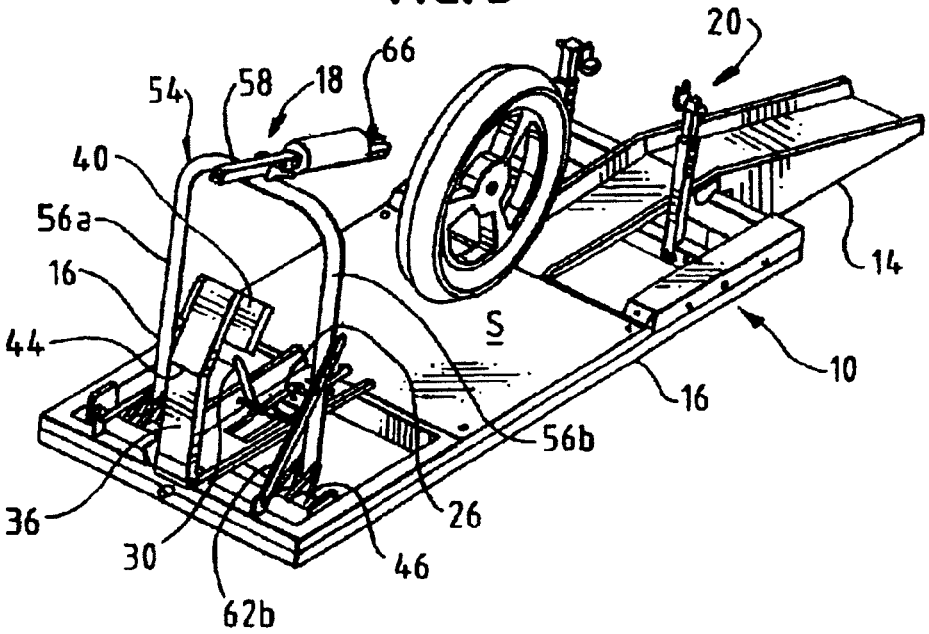
FIG. 3 is a top perspective view of the motorcycle lift as shown from the front of the lift.

As best seen in FIG. 2, the frame 12 includes a plurality of longitudinal and transverse members 22a, b and 24a–d hat provide the necessary support, stability and rigidity to the lift 10. Some of these structural components further provide functional operability to the lift 10 as will be described herein.

Referring now to FIGS. 1, 3 and 4A–4C, the front wheel locking assembly 16 includes a pivoting saddle 26 that has a concave or arcuate shape that is configured for receiving the front wheel. A front portion 28 of the saddle 26 extends upwardly to prevent forward movement of the front wheel. A pair of angled arms 30 extend rearwardly and outwardly from about the front portion 28 to prevent the front wheel from pivoting (about its steering axis) when it is positioned in the saddle 26. This lends further stability to the motorcycle when it is secured in the lift 10.

Figure 4A:
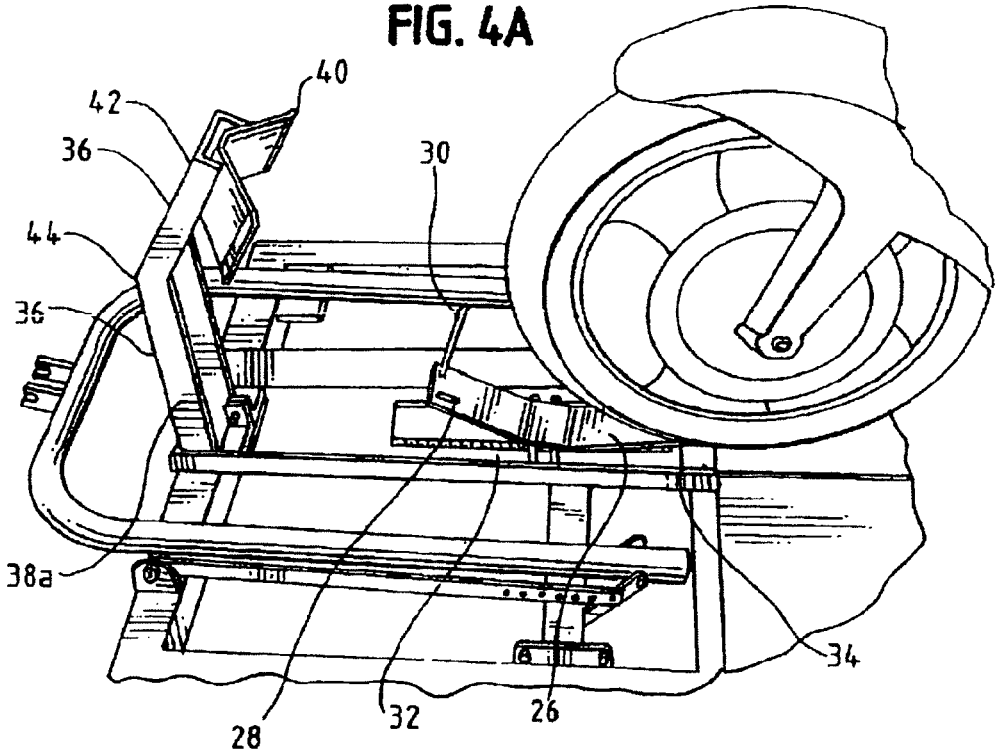
FIGS. 4A–4C illustrate positioning a front wheel of a motorcycle into a saddle portion of the lift and into the front wheel lock assembly.
Figure 4B:
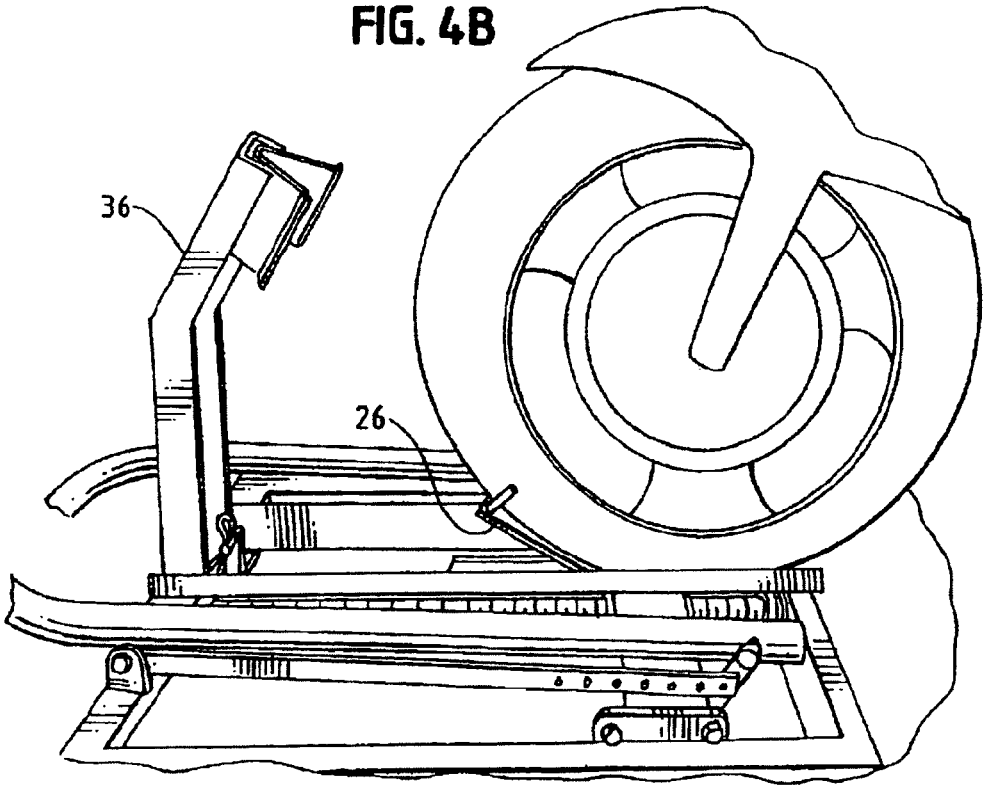
Figure 4C:
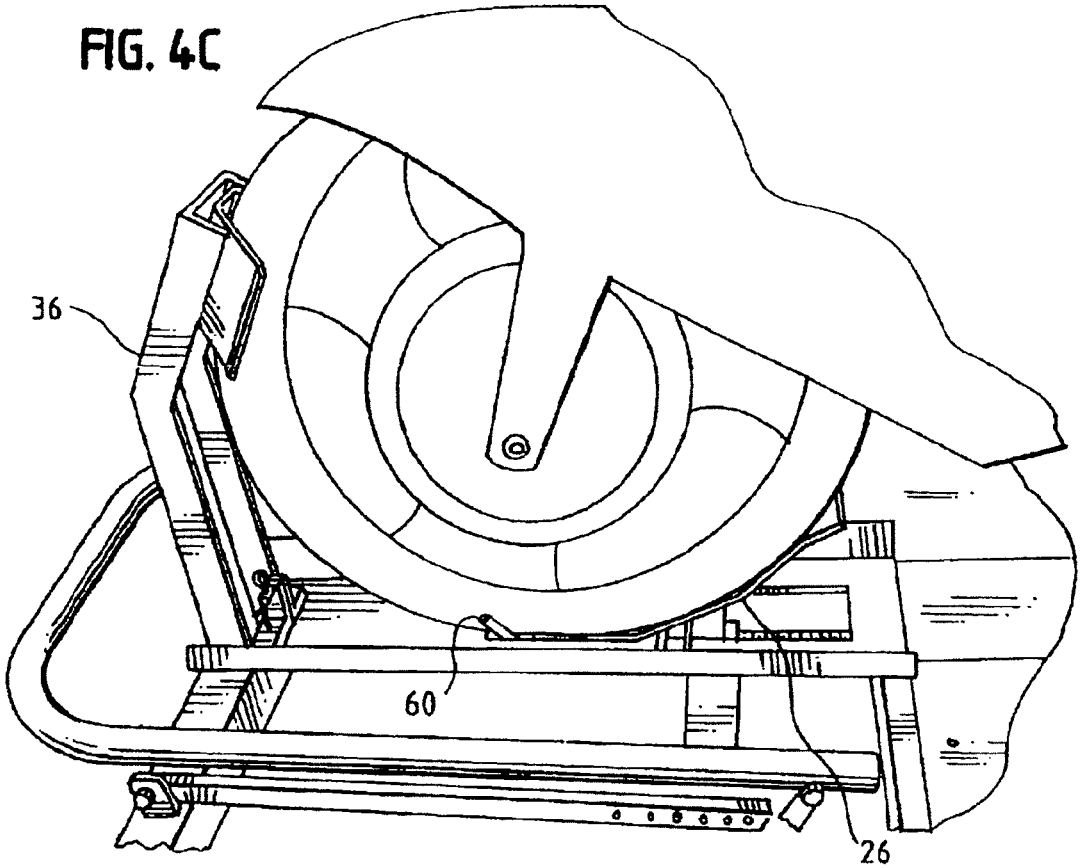

The saddle 26 is mounted to the frame 12 along the wheel-way W. The saddle 26 includes a pivot pin 32, and is configured to pivot between an entry position, as seen in FIG. 4A, and a locking position, as seen in FIG. 4C. In the entry position, a rear portion 34 of the saddle 26 is flush with the surface S to permit rolling the front wheel onto the saddle 26. In the locking position, the saddle 26 is pivoted forwardly. In this position, the rear surface 34 is elevated from the lift surface S and the front portion 28 of the saddle 26 pivots downwardly. In this manner, when the motorcycle is rolled onto the lift 10 and the front wheel moves on the saddle 26 beyond the pivot pin 32, the saddle 26 pivots from the entry position to the locking position.

The front wheel locking assembly 16 further includes a wheel stop 36 positioned along the wheel-way W, forward of the saddle 26. In a present embodiment, the wheel stop 36 is configured as a bent channel-like member in which the front wheel is held between the sides 38a,b of the channel 36. An angled flange 40, configured as a generally V-shaped member is mounted to an upper portion 42 of the wheel stop 36. The angled flange 40 centers the wheel within the wheel stop 36 as the front wheel is rolled across the saddle 26 and into the wheel stop 36. The bend 44 in the wheel stop 36 is rearwardly, i.e., toward the saddle 26, so that as the front wheel is rolled across the saddle 26 it is secured between the wheel stop channel sides 38a,b and the pivoted (FIG. 4C) saddle 26.

The lift 10 front end lift assembly, indicated generally at 18, includes a drive bar 46 that is mounted transverse to the lift 10 and is configured to move longitudinally along the lift 10. The drive bar 46 extends between outer structure frame members 22a,b. The frame members 22a,b provide a track as well as a bearing surface along which the drive bar 46 traverses.

The drive bar 46 is operably connected to a drive, such as the exemplary electric motor 48. The drive 48 includes a linkage having a screw-type drive connection 50 between the drive bar 46 and the motor 48. In this arrangement, the motor 48 rotates the screw 50 which is positioned in a threaded receptacle 52 in the drive bar 46. As the screw 50 rotates, the drive bar 46 is driven longitudinally along the frame 12 between members 22a,b. Other drive arrangements, such as chains, belts, worm gear assemblies, gears, linkages, hydraulic and pneumatic drives, as well as manual (e.g., crank-type) drives and the like will be recognized by those skilled in the art and are within the scope and spirit of the present invention.

An inverted U-shaped support carriage 54 is mounted, at its legs or free ends 56a,b to the drive bar 46. A transverse portion 58 of the carriage 54 extends parallel to the drive bar 46 above the lift surface S. The support carriage legs 56a,b are spaced apart and reside on either side of the motorcycle during lifting operation. In this arrangement, the support carriage 54 provides additional stability by distributing the weight of the motorcycle, during lifting, equally, transversely across the lift 10, and away from the longitudinal centerline A of the lift 10.

The support carriage legs 56a,b are pivotally mounted to the drive bar 46, as indicated at 60. A pair of brace arms 62a,b are pivotally mounted to the frame 12, with one brace arm extending to each of the support carriage legs 56a,b. The brace arms 62a,b are pivotally mounted to the support carriage 54 and link the carriage 54 to the frame 12 to maintain the carriage 54 upright during the motorcycle front end lifting operation.

A lifting arm 64 is pivotally mounted to the transverse portion 58 of the support carriage 54. The lifting arm 64 is mounted centrally on the carriage transverse portion 58, generally parallel to and above the wheel-way W. The lifting arm 64 raises and lowers along with movement of the carriage transverse portion 58. The lifting arm 64 is configured for securing to a structural member of the motorcycle (as will be described below) to elevate or lift the front end of the motorcycle. In a present embodiment, a lifting pin 66 extends upwardly from an end of the lift arm 64. The pin 66 inserts into the motorcycle structural member for lifting.

The rear end lock and lift arrangement 20 includes a drive bar 70, similar to the front end lift arrangement drive bar 46. The rear end lift arrangement drive bar 70 extends transverse to the frame 12 and moves longitudinally therealong. The longitudinal frame members 22a,b provide a track as well as a bearing surface for movement of the drive bar 70.

A drive arrangement 72 that includes, for example, an electric motor 74 and a linkage 76 having a screw-type drive connection 78 is operably connected to the rear end drive bar 70. Other drive arrangements, such as chains, belts, worm gear assemblies, gears, linkages, hydraulic and pneumatic drives, as well as manual (e.g., crank-type) drives and the like, can be used for connecting the rear drive to the rear drive bar will be recognized by those skilled in the art and are within the scope and spirit of the present invention.

A pair of upstanding, pivotal support arms 80a,b are mounted to the rear end drive bar 70. The rear support arms 80a,b are configured for attaching to a rear end portion of the motorcycle, preferably the rear wheel assembly at the swing arm. The mounting arrangement for the arms 80a,b can include, for example, a U or V-shaped clip, as shown at 82 that engages a peg P on the swing arm, a clamping assembly 83, to support and clamp to the swing arm G (FIGS. 5–7) or the like for securing to the swing arm G. The clip arrangement 82 is preferable if a peg P is available in that it can be universally used with most motorcycles M.

The present lift 10 is quite versatile. It can be used as a stand to secure the motorcycle M in an upright position with both wheels on the lift surface (FIG. 7) to, for example, drain the motor oil. It can also be used to raise the front wheel off of the surface S, with the rear wheel on the surface S to, for example, remove the front wheel. It can also be used to raise the rear wheel off of the surface S with the front wheel on the surface S to, for example, remove the rear wheel. Lastly, it can be used to raise both the front and rear wheel off of the lift surface S.

In use, the motorcycle M is wheeled up to the entrance ramp 14 and is moved onto the lift 10 along the wheel-way W. The motorcycle M is wheeled forward until the front wheel enters the saddle 26. Further urging the front wheel forward moves the front wheel along the saddle 26 so that the saddle 26 pivots forwardly (as seen in FIG. 4C) and so that the front wheel rests within the front wheel stop assembly 36. In this position, the motorcycle M is secured to the lift 10 and is fully stable. As such, maintenance that does not require lifting the motorcycle M (but merely stability) can be performed when the motorcycle M is secured in this manner.

When using the lift 10 to elevate the front and/or rear of the motorcycle M, and prior to mounting the motorcycle to the lift 10, the front drive bar 46 is in a retracted condition, i.e., toward a center of the lift 10. The rear drive bar 70 can be in either a retraced condition (toward the center of the lift, FIG. 5A), or in an extended condition (toward the rear of the lift, FIG. 6A). In either condition, the point of attachment of the arm 80 to the motorcycle swing arm G, such as at peg P, cannot be immediately above the position of the drive bar 70 and arm base 82a,b. That is, the arms 80a,b cannot be vertical; rather they must be at an angle between the vertical and horizontal.

Figure 7:
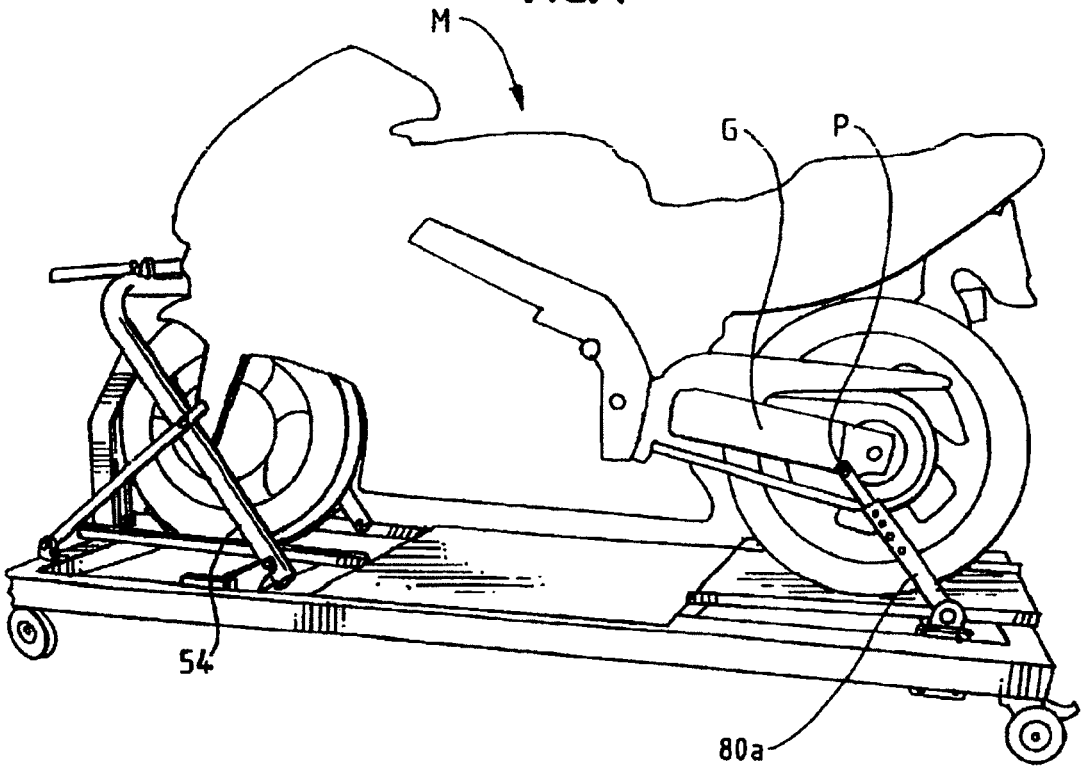
FIG. 7 illustrates the lift with a motorcycle positioned thereon, secured in the front wheel locking assembly, with both the front and rear wheels on the lift surface.

Referring now to the front portion of the lift 10, when ready for lifting the front of the motorcycle M, the angle of the support carriage 54 to the horizontal is smallest, as seen in FIG. 7. The lift bar 64 is then positioned so as to mount to a structural portion of the front end of the motorcycle M. Preferably, the lift bar lifting pin 66 is inserted into a lower triple clamp of the motorcycle at the pivot axis center. Those skilled in the art will recognize the triple clamp as that portion of the motorcycle at which the front fork bifurcates and that includes a tubular portion about which the front fork pivots.

With the lift arm pin 66 inserted into the triple clamp, and with the front wheel residing in the saddle 26 and in the front wheel stop assembly 36, the rear support arms 80a,b are mounted to a structural portion of the motorcycle. Again, as set forth above, the rear arms 80a,b are preferably mounted to the swing arms G of the motorcycle. Those skilled in the art will recognize that the swing arms are those arms that extend generally along the motorcycle frame for attaching the rear wheel to the motorcycle frame.

Figure 5A:
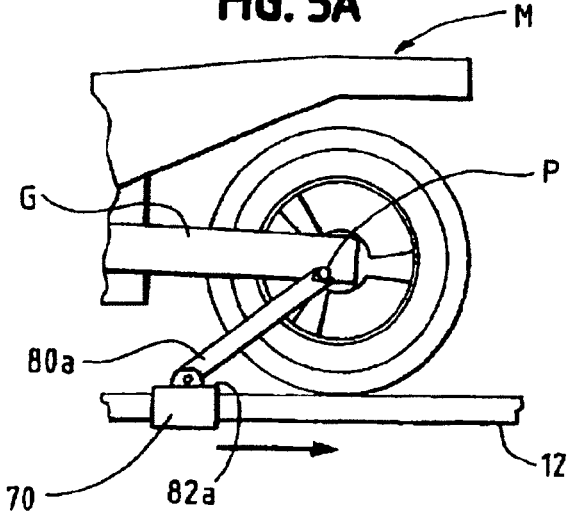
FIGS. 5A–B illustrate lifting the rear wheel of the motorcycle from the lift surface with the rear end lift operating in a tension lifting mode.
Figure 6A:
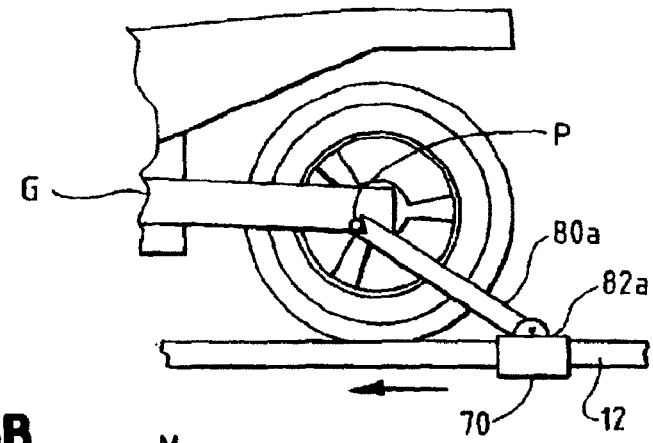
FIGS. 6A–B illustrate lifting the rear wheel of the motorcycle from the lift surface with the rear end lift operating in a compression lifting mode.

The rear support arms 80a,b can be mounted to the motorcycle M in one of two ways. In either manner, the arms 80a,b are positioned at an angle to the lift 10, with the bases 82a,b (that is, those portions of the arms 80a,b that are attached to the drive bar 70), below and to the side (either front or rear of) the point of attachment P to the motorcycle, as seen in FIGS. 5A and 6A. In this manner, the arms 80a,b are at an angle to the vertical. With the rear support arms 80a,b mounted to the swing arms G, the motorcycle M is mounted to the lift 10 in a fully stable condition, and is ready for lifting.

Figure 5B:
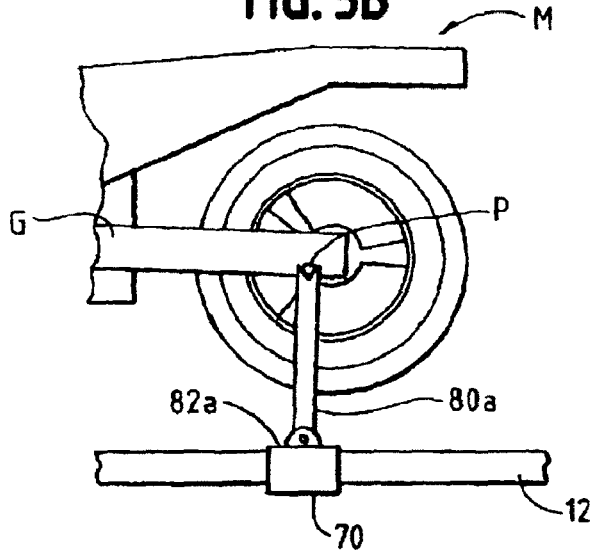

In one front end lifting configuration (a tension lifting mode, as seen in FIGS. 5A and 5B), the rear support arms

80a,b are mounted to the motorcycle M with the bases 82a,b of the arms forward or inwardly of the point of connection P. That is, the bases 82a,b are closest to the forward end of the lift 10. When lifting the front end of the motorcycle M from this position, the front drive 48 is actuated. The drive bar 46 moves forwardly along the frame 12. As the drive bar 46 moves forwardly, the base of the support carriage 54 (which is mounted to the drive bar 46, as indicated at 60), is moved toward the front end of the lift 10. In moving the drive bar 46, the angle of the carriage 54 passes from an inclined position toward a vertical position.

As the carriage 54 moves toward the vertical, the carriage transverse portion 58 moves upwardly, that is away from lift surface S. Those skilled in the art will recognize that because the connections between the support carriage 54, the drive bar 46 and the brace arms 62a,b are all pivoting connections, the entire front end lift assembly 16 moves to raise the carriage transverse member 58. In that the transverse member 58 moves upwardly, the lift arm 64 moves upwardly as well. As the lift arm 64 moves upwardly, so too does the front end of the motorcycle.

Figure 8:
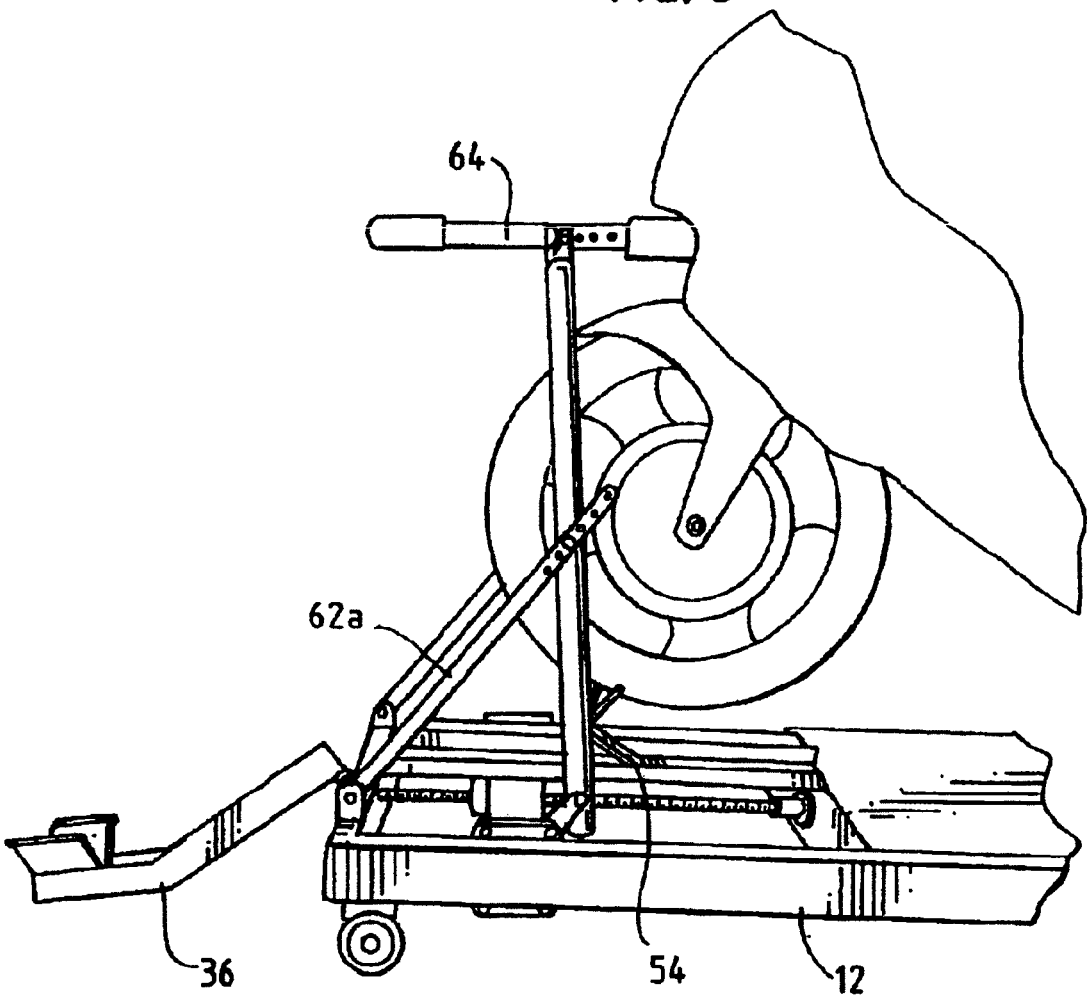
FIG. 8 illustrates the front end of the lift with a motorcycle positioned thereon and being raised from the surface, the lift shown with the front wheel stop pivoted downwardly for access to the front wheel.

During upward movement of the transverse portion 58 (and the motorcycle front end), the motorcycle M is "pulled" forward. To this end, because the rear end of the motorcycle is mounted to the rear support arms 80a,b (which pivot about the rear drive bar 70), the rear end of the motorcycle will likewise lift from the surface S. As the lifting of the front of the motorcycle continues, the front wheel m ves out of the saddle 26 and out of the wheel stop assembly 36. As seen in FIG. 7, the wheel stop 36 can then be pivoted downwardly or moved out of the way (by disengagement from the frame, FIG. 8) to provide unobstructed access to the front wheel. It has been observed that even though the front wheel of the motorcycle is raised out of the saddle 26 and wheel stop assembly 36, the present lift 10 maintains the motorcycle acceptably stable for carrying out maintenance or the like on the motorcycle.

Figure 6B:
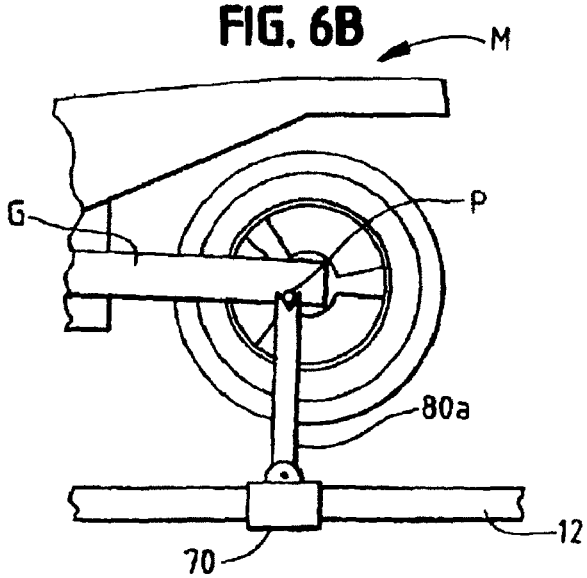

In the other front end lifting configuration (a compression lifting mode, as seen in FIGS. 6A and 6B), the support arms 80a,b are mounted to the motorcycle M with the arm bases 82a,b rearwardly or outwardly of the point of connection P. That is, the bases are farthest from the forward end of the lift 10. When lifting the front end of the motorcycle from this position, the front drive 48 is actuated. The drive bar 46 moves forwardly along the frame 12. As the drive bar 46 moves forwardly, the base of the support carriage 54 (which is mounted to the drive bar 46, as indicated at 60), is moved toward the front end of the lift 10. In moving the drive bar 46, the angle of the carriage 54 passes from an inclined position toward a vertical position.

As the carriage 54 moves toward the vertical, the carriage transverse portion 58 moves upwardly, that is away from lift surface S. Those skilled in the art will recognize that because the connections between the support carriage 54, the drive bar 46 and the brace arms 62a,b are all pivoting connections, the entire front end lift assembly 16 moves to raise the carriage transverse member 58. In that the transverse member 58 moves upwardly, the lift arm 64 moves upwardly as well. As the lift arm 64 moves upwardly, so too does the front end of the motorcycle.

During upward movement of the traverse portion 58, as the front end of the motorcycle M is raised off of the surface S, the rear of the motorcycle is maintained stable by the rear support arms 80a,b. More specifically, the angle of the rear support arms 80a,b (see FIG. 6A), when they are linked or mounted to the motorcycle M is such that they provide stability to the motorcycle frame. Again, once the front end of the motorcycle M is raised from the surface, the front wheel moves out of the saddle 26 and out of the wheel stop assembly 36, and the wheel stop 36 can be moved for unobstructed access to the front wheel.

As set forth above, the rear wheel can be lifted independently of the front wheel. Also analogous to the front lifting configuration and function, the rear wheel can be lifted in one of two different configurations; however, in both of these configurations, the front wheel is maintained in the front wheel locking assembly 16.

In a first rear end lifting configuration, the rear support arms 80a,b are mounted to the motorcycle with the arm bases 82a,b forward or inwardly of the point of connection P. That is, the bases 82a,b are closest to the forward end of the lift 10. Actuating the rear end drive assembly 72 to move the rear drive bar 70 rearwardly moves the rear support arms 80a,b, which are at an angle relative to the vertical (see FIG. 5A) rearwardly, and at the same time pivots the arms 90a,b toward an upright or vertical orientation (see FIG. 5B).

This movement of the rear support arms 80a,b raises the rear end of the motorcycle M. When this lifting mode is used, the front wheel can be secured to the front wheel stop 36 by, for example, a strap or the like (not shown). As will be recognize by those skilled in the art, because this mode of lifting "pulls" the motorcycle rearwardly, the front wheel tends to pull out of the cradle 26 and wheel stop 36. Strapping the front wheel to the wheel stop 36 prevents disengagement of the wheel from the stop 36.

In a second rear end lifting configuration, the rear support arms 80a,b are mounted to the motorcycle with the arm bases 82a,b rearwardly or outwardly of the point of connection P. That is, the bases 82a,b are closest to the rear end of the lift 10. Actuating the rear end drive assembly 72 to move the rear drive bar 70 forwardly moves the rear support arms 80a,b, which are at an angle relative to the vertical (see FIG. 6A) forwardly, and at the same time pivots the arms 80a,b toward an upright or vertical orientation (see FIG. 6B). This movement of the rear support arms 80a,b raises the rear end of the motorcycle. When this lifting mode is used, the front wheel need not be secured to the front wheel stop 36. As will be recognize by those skilled in the art, because this mode of lifting "pushes" the motorcycle M forwardly, the front wheel is further urged into the wheel stop 36.

Advantageously, it has been found that the present lift 10 can be used to raise the rear end of the motorcycle whether the front end is raised or on the surface S. Because the front end of the motorcycle is support from about the triple clamp (which is generally above the center of gravity of the motorcycle), it is stable when both the front and rear wheels are raised from the wheel-way.

As will be appreciated by those skilled in the art, because of the pivoting connections at the front end lift assembly 16 and the rear end lift assembly 20, all of the members of these assemblies can be folded downwardly to rest on the frame 12. In addition, the front wheel stop assembly 36 can be removed from the frame 12 and/or folded downwardly onto the frame 12. In this manner, the entire lift 10 can essentially be folded down for storage or transport. A present lift 10 can be folded down to less than about 12 inches for storage when it is not in use or for transport to a desired location.

As will also be understood by those skilled in the art, the connections between the support carriage 54 and the front drive bar 46, the support carriage 54 and the brace arms 62a,b, the lifting arm 64 and the support carriage 54, the rear support arms 80a,b (vertically, as indicated at 84, as well as transversely, as indicated at 86, along the rear drive bar 70, and at the clamps 82), the front wheel stop 36 to the frame 12 and the saddle pivot 32 within the frame 12 are all adjustable by a variety of openings in the various members and pins insertable and lockable therein. This myriad adjustability permits use of a single lift 10 that can accommodate essentially any type of motorcycle.

As set forth above, the present lift 10 is fully portable. To this end, casters 88 (rear only shown) can be mounted to the bottom of the lift 10 so that the lift 10 can be wheeled from one location to another. In addition, a scissor jack or other known elevating device (not shown) can be mounted to the bottom of the lift 10 to elevate the entire lift 10 above the ground to provide additional working height to the lift 10. Also, as will be appreciated by those skilled in the art, the present lift 10 can be mounted to a flat bed or the like so that it can be readily transported from one location to another and set up for use. For example, the lift 10 can be loaded onto a truck and can be moved from a shop to a desired destination, such as a motorcycle racing venue.

As will also be appreciated by those skilled in the art as discussed above, the lift 10 can be used as a stand for performing maintenance on the motorcycle, without lifting the motorcycle. For example, to change the motor oil, the motorcycle need not be lifted; rather, the motorcycle merely needs to be secured in an upright position. To this end, the front wheel locking assembly 16 (saddle 26 and wheel stop 36) can be used (without the front end lift arm 64 engaged and without the rear end lift arms 80a,b engaged) to secure the motorcycle in place. This is, it has been found that with the front wheel resting in the saddle 26 and within the front wheel stop 36, the motorcycle is sufficiently stable to conduct many non-lift-required maintenance procedures.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A motorcycle stand for securing a motorcycle in an upright orientation, the motorcycle having a front wheel, the [device] *stand* comprising:

a frame defining a wheel-way along a generally longitudinal path on the frame, the wheel-way defining a surface; and a front wheel locking assembly, the front wheel locking assembly including a pivoting saddle *adjustably* mounted to the frame along the wheel-way, the saddle having a concave shape and including an entrance portion lying along the wheel-way for receiving the front wheel of the motorcycle and pivoting between an entry position wherein the entrance portion lies on the surface and a locking position wherein the entrance portion is raised from the surface when the front wheel passes over and beyond [the] *a* pivot *pin*, the front wheel locking assembly further including a wheel stop for engaging the front wheel when the motorcycle is moved onto the stand and when the front wheel is positioned in the pivoting saddle, wherein the pivoting saddle pivots about [a] *the* pivot pin and wherein the pivoting saddle is movable along *the wheel-way along* the generally longitudinal path [on the lift] *on the frame toward or away from the wheel stop*.

2. The motorcycle stand in accordance with claim 1 wherein the wheel stop including an angled V-flange extending from an upper end thereof.

3. The motorcycle stand in accordance with claim 1 wherein the pivoting saddle includes a pair of angled arms extending outwardly from a top portion thereof.

4. The motorcycle stand in accordance with claim 1 wherein the front wheel stop includes an upwardly extending surface for engaging the front wheel.

5. The motorcycle stand in accordance with claim 4 wherein the upwardly extending surface has a structural channel configuration having a transverse bend therein.

6. A motorcycle stand for securing a motorcycle in an upright orientation, the motorcycle having at least one of a front wheel and a rear wheel, the [device] *stand* comprising:

a frame; and a wheel locking assembly, the wheel locking assembly configured to receive the front wheel or the rear wheel from a surface on which the motorcycle is resting, the wheel locking assembly including a pivoting saddle *adjustably* mounted to the frame, the saddle having a concave shape and including an entrance portion lying substantially on the surface for receiving the wheel of the motorcycle and a rear portion opposite the entrance portion, the saddle configured for pivoting between an entry position wherein the entrance portion lies on the surface and a locking position wherein the entrance portion is raised from the surface, the saddle further including a pivot between the entrance portion and the rear portion, the saddle configured to pivot from the entry position to the locking position when the wheel passes beyond the pivot, wherein the pivoting saddle pivots about a pivot pin and wherein the pivoting saddle is movable along [the] *a wheel-way along a* generally longitudinal path [on the lift] *on the frame toward or away from a wheel stop*, the wheel locking assembly further including [a] *the* wheel stop at about the rear portion for engaging and securing the wheel when the motorcycle is moved onto the stand and when the wheel is positioned in the saddle beyond the pivot such that the saddle pivots to the locking position, wherein the motorcycle is maintained in the upright orientation by lockingly securing the wheel between the wheel stop and saddle pivoted into the locking position.

7. The motorcycle stand in accordance with claim 6 wherein the wheel stop includes an angled V-flange extending from an upper end thereof.

8. The motorcycle stand in accordance with claim 6 wherein the pivoting saddle includes a pair of angled arms extending outwardly from the rear portion thereof.

9. The motorcycle stand in accordance with claim 6 wherein the front wheel stop includes an upwardly extending surface for engaging the front wheel.

10. The motorcycle stand in accordance with claim 9 wherein the upwardly extending surface has a structural channel configuration having a transverse bend therein.

* * * * *